United States Patent
Chaudhuri et al.

(10) Patent No.: US 9,202,141 B2
(45) Date of Patent: *Dec. 1, 2015

(54) SYSTEM FOR CREATING A CAPSULE REPRESENTATION OF AN INSTRUCTIONAL VIDEO

(71) Applicant: Indian Institute of Technology Bombay, Maharashtra (IN)

(72) Inventors: Subhasis Chaudhuri, Maharashtra (IN); Ranjith Ram Aladukkam, Kerala (IN)

(73) Assignee: INDIAN INSTITUTE OF TECHNOLOGY BOMBAY (IN)

( * ) Notice: Subject to any disclaimer, the term of this patent is extended or adjusted under 35 U.S.C. 154(b) by 79 days.

This patent is subject to a terminal disclaimer.

(21) Appl. No.: 13/692,564

(22) Filed: Dec. 3, 2012

(65) Prior Publication Data

US 2013/0094771 A1    Apr. 18, 2013

Related U.S. Application Data

(63) Continuation of application No. 12/627,408, filed on Nov. 30, 2009, now Pat. No. 8,345,990.

(30) Foreign Application Priority Data

Aug. 3, 2009    (IN) .......................... 1779/MUM/2009

(51) Int. Cl.
    *G06K 9/62*    (2006.01)
    *G06K 9/00*    (2006.01)
    (Continued)

(52) U.S. Cl.
    CPC .......... *G06K 9/6267* (2013.01); *G06K 9/00751* (2013.01); *G11B 27/105* (2013.01); *G11B 27/28* (2013.01); *H04N 9/80* (2013.01)

(58) Field of Classification Search
    USPC .................................. 382/224, 112; 386/241
    See application file for complete search history.

(56) References Cited

U.S. PATENT DOCUMENTS 5,537,483 A * 7/1996 Stapleton et al. ............. 382/309
6,278,446 B1   8/2001 Liou et al.
(Continued)

FOREIGN PATENT DOCUMENTS

JP       2002520747 A    7/2002
KR    1020080100241 A    11/2008
KR    1020080100242 A    11/2008

OTHER PUBLICATIONS

Wang et al., No-reference Perceptual Quality Assessment of JPEG Compressed Images, 2002, Proc. IEEE ICIP.*

(Continued)

*Primary Examiner* — John Strege
(74) *Attorney, Agent, or Firm* — Brundidge & Stanger, P.C.

(57) ABSTRACT

A method is provided that creates a lecture video capsule containing highlights of an original instructional video based on visual quality and content. The method includes segmenting and recognizing activities in the instructional video using a hidden Markov model (HMM). The activities are classified into three categories: talking head, writing hand and slideshow. The talking head frames are classified as non-content frames, while the writing hand and slideshows are classified as content frames. A non-reference based objective quality assessment of the non-content frames may be performed to detect high quality frames. Statistical parameters of an intensity histogram and a horizontal projection profile (HPP) of the content frames may be used to derive an objective quality measure of the content frames that is used to extract high quality content frames. The selected high quality non-content and content frames form a video clip or capsule, which is a temporally compressed representation of the video.

15 Claims, 19 Drawing Sheets

(51) Int. Cl.
*G11B 27/10* (2006.01)
*G11B 27/28* (2006.01)
*H04N 9/80* (2006.01)

(56) References Cited

U.S. PATENT DOCUMENTS

| | | | |
|---|---|---|---|
| 6,473,095 | B1 | 10/2002 | Martino et al. |
| 6,549,643 | B1 | 4/2003 | Toklu et al. |
| 6,690,725 | B1 | 2/2004 | Abdeljaoud et al. |
| 6,870,573 | B2 | 3/2005 | Yeo et al. |
| 7,143,352 | B2 | 11/2006 | Divakaran et al. |
| 7,760,956 | B2 * | 7/2010 | Lin et al. ............... 382/254 |
| 7,826,657 | B2 * | 11/2010 | Zhang et al. ............ 382/162 |
| 8,265,392 | B2 | 9/2012 | Wang et al. |
| 8,605,945 | B2 | 12/2013 | El-Maleh et al. |
| 2001/0033694 | A1 | 10/2001 | Goodman et al. |
| 2002/0018594 | A1 | 2/2002 | Xu et al. |
| 2003/0210886 | A1 | 11/2003 | Li et al. |
| 2004/0170321 | A1 | 9/2004 | Gong et al. |
| 2005/0228849 | A1 * | 10/2005 | Zhang ..................... 709/200 |
| 2006/0280365 | A1 * | 12/2006 | Gong et al. ............. 382/173 |
| 2007/0030396 | A1 * | 2/2007 | Zhou et al. ............. 348/700 |
| 2010/0215277 | A1 * | 8/2010 | Huntington et al. ..... 382/218 |

OTHER PUBLICATIONS

Ren et al.: "A Video Summarization Approach Based on Machine Learning," Intelligent Information Hiding and Multimedia Signal Processing, 2008, IEEE Xplore Digital Library, pp. 450-453.

Phan et al.: "A Laplacian Method for Video Text Detection," 2009 10th International Conference on Document Analysis and Recognition, IEEE Computer Society. pp. 66-70.

Xi et al.: "A Video Text Detection and Recognition System," IEEE International Conference on Multimedia and Expo, 2001.

Hua et al.: "Automatic Location of Text in Video Games," Proceedings of the ACM workshops on Multimedia, 2001.

Basak et al.: "Video Summarization with Supervised Learning," 19th International Conference on Pattern Recognition, 2008.

Office Action issued on corresponding Chinese Application No. 201080034465.9 on Jan. 26, 2014.

Arvind et al., Automatic text block separation in document images, 2006, IEEE.

Liu. et al., Rule-based Semantic Summarization of Instructional Videos, 2002, IEEE.

International Search Report and Written Opinion of the International Searching Authority issued by the Australian Patent Office in International Patent Application No. PCT/IB2010/001621 mailed Oct. 15, 2010.

Kittler, J., et al., "On Threshold Selection Using Clustering Criteria", IEEE Transactions on SMC, vol. 15, pp. 652-655, 1985.

Ram, A., et al., "Automatic Capsule Preparation for Lecture Video", IEEE 2009 International Workshop on Technology for Education (T4E 2009), pp. 10-16, Aug. 4-6, 2009.

Web-document, "Echoecho.com tutorials: Flash tutorial," Retrieved from Internet on Jun. 20, 2012: URL:http://www.echoecho.com/flash.htm.

Schaffhauser, D., "Canadian University Offers Students Ability to Highlight Lecture Videos", Campus Technology 2010 1105 Media Inc., pp. 1-3, http://campustechnology.com/Articles/2008/02/Canadian-University-Offers-Students-Ability-To-Highlight-Lecture-Videos.aspx.

Rav-Acha Alex, et al., "Making a Long Video Short: Dynamic Video Synopsis", Proceedings of the 2006 IEEE Computer Society Conference on CVPR, Jun. 2006, vol. 1, pp. 1-7.

Rui Yong, et al., "Automatically Extracting Highlights for TV Baseball Programs", Proceedings of the Eighth ACM International Conference on Multimedia, 2000, pp. 1-11.

Chang Peng, et al., "Extracted highlights from Baseball Game Video with Hidden Markov Models," Proceedings of the IEEE International Conference on Image Processing, 2002, pp. 1-4.

Syeda-Mahmood Tanveer and Ponceleon Dulce, "Learning Video Browsing Behavior and its Application in the Generation of Video Previews", Proceedings of the Ninth ACM International Conference on Multimedia, Oct. 2001, vol. 9, pp. 119-128.

Wang Zhou, Sheikh Hamid R. and Bovik Alan C., "No-Reference Perceptual Quality Assessment of JPEG Compressed Images", Proceedings of the IEEE International Conference on Image Processing, Sep. 2002, pp. 1-4.

Sheikh Hamid Rahim, Bovik Alan C. and Cormack Lawrence, "No-Reference Quality Assessment Using Natural Scene Statistics: JPEG2000", IEEE Transactions on Image Processing, Dec. 2005, vol. 14, No. 12, pp. 1-21.

Rabiner L.R. and Juan B.H., "An Introduction to Hidden Markov Models", IEEE ASSP Magazine, Jan. 1986, pp. 4-16.

Robertson Neil and Reid Ian, "A General Method for Human Activity Recognition in Video", Journal of Computer Vision and Image Understanding, 2006, vol. 104, No. 2 pp. 1-27.

Brand Matihew and Kettnaker, "Discovery and Segmentation of Activities in Video", IEEE Transaction on Pattern Analysis and Machine Intelligence, Aug. 2000, vol. 22, No. 8, pp. 844-851.

Liu Tiecheng and Kender John R., "Lecture Videos forE-Learning: Current Research and Challenges", Proceedings of the IEEE Sixth International Symposium on Multimedia Software Engineering, Dec. 13-15, 2004, pp. 1-5.

Dagtas, S. and Abdel-Mottaleb, M., "Extraction of TV Highlights Using Multimedia Features", Proceedings of the Fourth IEEE Workshop on Multimedia Signal Processing, 2001, pp. 91-96.

Niu Feng and Abdel-Motialeb M., "HMM-Based Segmentation and Recognition of Human Activities from Video Sequences", IEEE International conference on Multimedia and Expo, Jul. 2005, pp. 1-4.

Pal N.R. and Pal S.K., "Entropy: A New Definition and its Applications", IEEE Transactions on Systems, Man and Cybernetics, Oct. 1991, vol. 21, Issue 5, pp. 1260-1270.

Pal N.R. and Pal S.K., "Object-Background Segmentation Using New Definitions of Entropy", IEEE Proceedings Computers and Digital Techniques, Jul. 1989, vol. 136, No. 4, pp. 284-295.

Moon T.K., "The Expectation-Maximization Algorithm", IEEE Signal Processing Magazine, Nov. 1996, vol. 13, No. 6, pp. 47-60.

Lee Seong-Whan and Ryu Dae-Seok, "Parameter-Free Geometric Document Layout Analysis", IEEE Transactions on Pattern Analysis and Machine Intelligence, Nov. 2001, vol. 23, Issue 11, pp. 1240-1256.

Srihari Srihari N. and Govindaraju Venugopal, "Analysis of Textual Images Using the Hough Transform", Machine Vision and Applications, Jun. 1989, vol. 2, No. 3, pp. 141-153.

Rabiner Lawrence R. "A Tutorial on Hidden Markov Models and Selected Applications in Speech Recognition", In Proceedings of IEEE, Feb. 1989, vol. 77, No. 2, pp. 257-286.

\* cited by examiner

FIG. 2(c)

Examples of Process Design
- Methodology Selection
- Project planning/ Execution Plans
- Process and documentation standards
- Resource allocation charts
- Quality and reliability methods

FIG. 2(d)

$$W_i(t) = \frac{W_i(G, t)}{P_i} = \text{NORMALIZED SERVICE BY SESSION "S" DURING } (0, t)$$

$$B(t) = \{i_1 \text{ SUCH THAT } Q_i(t) > 0\}$$

$$B(t_0, t_2) = \{i_1 \text{ SUCH THAT } Q_i(t) > 0 \text{ for } t, < t, G + 2\}$$

$$U(t_0, t_2) = \{i_1 \text{ SUCH THAT } Q_i(t) > 0 \text{ for } t, < t, G + 2\}$$

FLUID FLOW IS DEFINED AS:

$$\frac{W_i(G, t)}{P_i} = \frac{W_j(G, t)}{P_j} \quad i, j \in B(G, t)$$

$$\Rightarrow W_i(G, t) = W_j(G, t)$$

FIG. 7(a)

$$W_i(t) = \frac{W_i(G,t)}{P_i} = \text{NORMALIZED SERVICE BY SESSION "S" DURING } (0, t)$$

$$B(t) = \{i_1 \text{ SUCH THAT } Q_i(t) > 0\}$$

$$B(t_0, t_2) = \{i_1 \text{ SUCH THAT } Q_i(t) > 0 \text{ for } t, < t, G+2\}$$

$$U(t_0, t_2) = \{i_1 \text{ SUCH THAT } Q_i(t) > 0 \text{ for } t, < t, G+2\}$$

FLUID FLOW FAIR QUEING IS DEFINED AS THE SERVER $$\frac{W_i(G,t)}{P_i} = \frac{W_j(G,t)}{P_j} \quad i,j \in B(G,t)$$

$$\Rightarrow W_i(G,t) = W_j(G,t)$$

FIG. 7(b)

$$W_i(t) = \frac{W_i(G,t)}{P_i} = \text{NORMALIZED SERVICE BY SESSION "S" DURING } (0, t)$$

$$B(t) = \{i_1 \text{ SUCH THAT } Q_i(t) > 0\}$$

$$B(t_0, t_2) = \{i_1 \text{ SUCH THAT } Q_i(t) > 0 \text{ for } t, < t, G+2\}$$

$$U(t_0, t_2) = \{i_1 \text{ SUCH THAT } Q_i(t) > 0 \text{ for } t, < t, G+2\}$$

FLUID FLOW FAIR QUEING IS DEFINED AS THE SERVER $$\frac{W_i(G,t)}{P_i} = \frac{W_j(G,t)}{P_j} \quad i,j \in B(G,t)$$

$$\Rightarrow W_i(G,t) = W_j(G,t)$$

What is covered in Product Design?
- Product architecture
- Subsystems, Interconnections
- Modules, Packages and Libraries
- Components and classes

What is covered in Product Design?
- Product architecture
- Subsystems, Interconnections
- Modules, Packages and Libraries
- Components and classes

FIG. 8(a)

$$\underline{x} = x_1, \ldots x_n$$

$$y_i = g_i(x_1, \ldots x_n) = g_i(\underline{x})$$

$$\underline{y} = (x_1, \ldots x_n) = \underline{g}(\underline{y})$$

$$\underline{x} = f(\underline{y}) = f_1(\underline{y}), f_2(\underline{y}), \ldots f_n(\underline{y})$$

$$\text{JACOBIAN } J = \begin{vmatrix} \frac{2f}{2g}, & \frac{2f_1}{2g_1}, & \cdots & \frac{2f_n}{2g_n} \\ \frac{2f}{2g}, & \frac{2f_1}{2g_1}, & \cdots & \frac{2f_n}{2g_n} \\ \vdots & \vdots & \ddots & \\ \frac{2f}{2g}, & \frac{2f_1}{2g_1}, & \cdots & \frac{2f_n}{2g_n} \end{vmatrix}$$

FIG. 8(b)

| 0.92 | 0.89 | 0.93 | 1 |
|---|---|---|---|
| 0.93 | 0.86 | 0.8 | 0.99 |
| 0.94 | 0.89 | 0.81 | 0.9 |
| 0.96 | 0.86 | 0.8 | 0.85 |
| 0.83 | 0.75 | 0.81 | 0.96 |
| 0.95 | 0.76 | 0.75 | 0.97 |
| 1 | 0.89 | 0.93 | 0.97 |
| 0.92 | 0.8 | 0.75 | 0.95 |

FIG. 8(c)

| 0.05 | 0.09 | 0.07 | 0 |
|---|---|---|---|
| 0.06 | 0.1 | 0.12 | 0.02 |
| 0.05 | 0.06 | 0.14 | 0.1 |
| 0.04 | 0.13 | 0.15 | 0.17 |
| 0.14 | 0.1 | 0.08 | 0.01 |
| 0.07 | 0.06 | 0.08 | 0.01 |
| 0 | 0.06 | 0.04 | 0.01 |
| 0.06 | 0.07 | 0.08 | 0.03 |

| 0.9 | 0.85 | 0.89 | 1 |
|---|---|---|---|
| 0.91 | 0.82 | 0.73 | 0.99 |
| 0.94 | 0.82 | 0.84 | 0.98 |
| 0.95 | 0.86 | 1 | 1 |
| 0.95 | 1 | 1 | 1 |
| 0.55 | 1 | 1 | 1 |
| 0.35 | 0.95 | 1 | 1 |
| 0.1 | 0.61 | 1 | 1 |

| 0.07 | 0.12 | 0.12 | 0 |
|---|---|---|---|
| 0.08 | 0.14 | 0.17 | 0.02 |
| 0.06 | 0.1 | 0.16 | 0.02 |
| 0.04 | 0.13 | 0 | 0 |
| 0.08 | 0 | 0 | 0 |
| 0.03 | 0 | 0 | 0 |
| 0.01 | 0.06 | 0 | 0 |
| 0.12 | 0.12 | 0 | 0 |

FIG. 9(c)

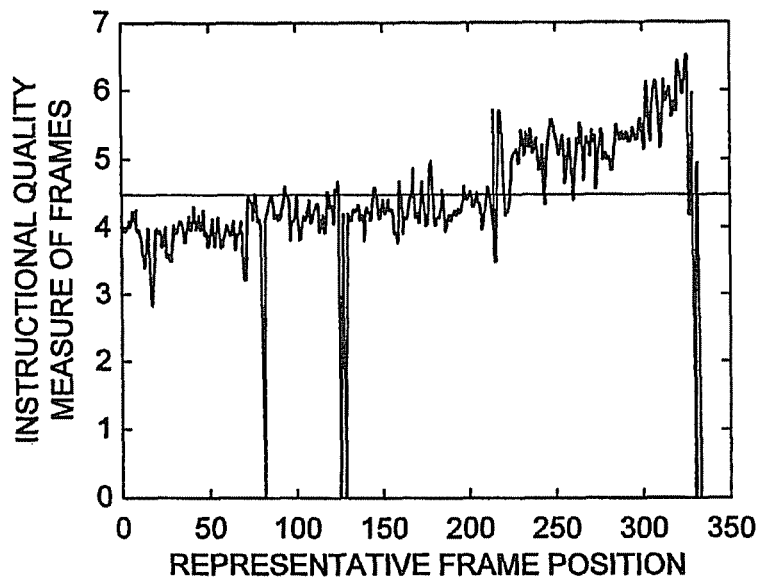

FIG. 9(d)

$$\underline{x} = x_1, \ldots x_n$$

$$y_i = g_i(x_1, \ldots x_n) = g_i(\underline{x})$$

$$\underline{y} = (x_1, \ldots x_n) = \underline{g}(\underline{y})$$

$$\underline{x} = f(\underline{y}) = f_1(\underline{y}), f_2(\underline{y}), \ldots f_n(\underline{y})$$

$$\text{JACOBIAN } J = \begin{vmatrix} \dfrac{2f}{2g}, & \dfrac{2f_1}{2g_1}, & \ldots & \dfrac{2f_n}{2g_n} \\ \dfrac{2f}{2g}, & \dfrac{2f_1}{2g_1}, & \ldots & \dfrac{2f_n}{2g_n} \\ \vdots & \vdots & \ddots & \\ \dfrac{2f}{2g}, & \dfrac{2f_1}{2g_1}, & \ldots & \dfrac{2f_n}{2g_n} \end{vmatrix}$$

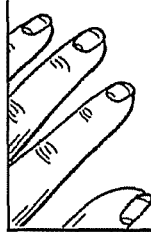

SYSTEM FOR CREATING A CAPSULE REPRESENTATION OF AN INSTRUCTIONAL VIDEO

CROSS-REFERENCE TO RELATED APPLICATION

This application is a continuation filing under 35U.S.C. §120 of U.S. patent application Ser. No. 12/627,408, filed Nov. 30, 2009, now U.S. Pat. No. 8,345,990, which claims priority under 35 U.S.C. §119 to a corresponding patent application filed in India and having application number 1779/MUM/2009, filed on Aug. 3, 2009, the entire contents of which are herein incorporated by reference.

BACKGROUND

Educators and educational institutes want to improve both the effectiveness and efficiency of knowledge transfer by incorporating technology. As use of chalkboards has evolved into use of overhead projectors, and further into use of digital presentations, live lectures have evolved into prerecorded video productions that are stored and available digitally, for example. Digitally available prerecorded video lectures have provided larger access to knowledge, and in some cases, entire courses may be taught via prerecorded video lectures.

When a student is interested in signing up for a particular course that is taught via prerecorded video lectures, it may be beneficial for the student to have an option to view a preview of the video lectures before committing to the course. One benefit of this option may be the student's opportunity to assess whether the instructor's teaching style is suitable for the student, for example. As such, previews of video lectures composed of highlights and features of the video lectures may be created and provided to students.

Currently, video previews are often produced manually by video editors, a process which may be time consuming and prone to inconsistencies. As video lectures become more prevalent, a more efficient method for generating video lecture previews may further increase the efficiency of knowledge transfer.

SUMMARY

A method for creating a representation of a lecture video containing highlights of the video is provided. The method includes receiving a lecture video that includes content frames and non-content frames. The non-content frames include an image of a person and the content frames include an image of text. The method also includes classifying frames of the video as non-content frames or content frames, assessing a quality of the non-content frames, and based on the quality of the non-content frames, selecting a number of the high quality non-content frames. The method also includes assessing a quality of the content frames by: (i) dividing a content frame into m by n blocks; (ii) determining a horizontal projection profile (HPP) for each block; (iii) determining an energy of the HPP for each block; (iv) summing the energy of the HPP for each block to obtain the energy of the content frame; and (v) determining the quality of the content frame based on the HPP and energy of the content frame. The method further includes based on the quality of the content frames, selecting a number of the high quality content frames, and forming a video clip including the selected non-content frames, the selected content frames, and a portion of frames surrounding the selected non-content frames and the selected content frames.

In another embodiment, the method for creating a representation of a video containing highlights of the video includes receiving a content frame sequence, constructing a histogram for each content frame in the content frame sequence, and processing the histogram for each content frame to generate a threshold value and statistical features. The method also includes detecting ink pixels on each content frame in the content frame sequence using the threshold value, analyzing the detected ink pixels on each content frame based on horizontal projection profiles (HPP) to generate content features of each content frame, and calculating quality scores for each content frame based on the statistical features and content features. The method further includes based on the quality scores, selecting a number of the high quality content frames, and forming a video clip including the selected content frames and a portion of frames surrounding the selected content frames in the content frame sequence.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
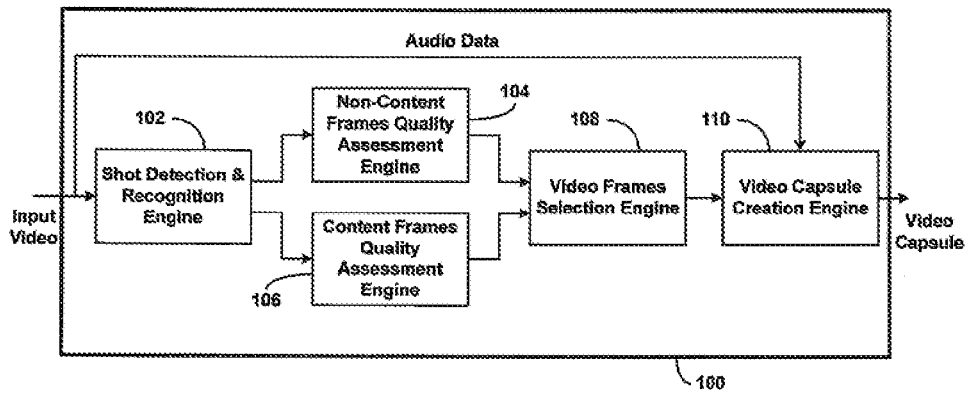
FIG. 1 is an example block diagram of a video capsule creation system.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

The present application describes example methods for creating a representation of a video that includes "highlights" of the video. Thus, the representation will be a shorter video than an original video, and following the processing methods below, the shorter video will focus on main points of the original video so as to give a viewer a preview of content of the video, for example.

In the field of education, where potential users are students, a fast preview of an entire lecture would be useful for the student before attending or buying the video for the whole course, for example. In this context, a lecture video capsule may help the students obtain a fast preview of content of a video. A video capsule contains highlights of the entire video.

Some examples of creating video highlights include monitoring audio levels for increased audio activity (e.g., in the case of sports video, interesting events occur with increased crowd activity by which the audio energy level is boosted) so that audio is a useful cue for sports video highlight creation. Also, visual information of a desired highlight, for example, a goal scored or a boundary hit, vary from the ambient one in sports videos, and thus sports video highlight creation use predefined models which can make use of visual as well as audio signals.

However, instructional lectures differ from sports or commercial videos because instructional lectures include activity recorded inside a classroom and include features much different from sports or commercial videos. Audio energy level is more or less the same throughout the lecture, and usually, the only cue that can be used is visual information. Moreover, it is difficult to use domain models because a highlight may occur at some point of the same activity like a talking head, writing hand, or slide show, for example. Thus, in exemplary embodiments described below, a method of creating a representation of a video includes processing non-content segments of the video (e.g., a talking head) using mere visual quality, and processing content segments of the video (e.g., a writing hand or slide show) using a quality measure based on both visual quality and content to extract instructional highlights. To define quality of a content frame, a method is provided that utilizes statistical features of visual content along with a horizontal projection profile (HPP) of a frame. High quality clips from both content and non-content segments are used in suitable proportions to create the video capsule. Audio coherence can be maintained by selecting the clips during media re-creation.

FIG. 1 is an example block diagram of a video capsule system 100. The system 100 includes a shot detection and recognition engine 102, a non-content frames quality assessment engine 104, a content frames quality assessment engine 106, a video frames selection engine 108, and a video capsule creation engine 110.

Any of the components of FIG. 1 may represent a module, a segment, or a portion of program code, which includes one or more instructions executable by a processor for implementing specific logical functions or steps in the process. The program code may be stored on any type of computer readable medium, for example, such as a storage device including a disk or hard drive. In addition, any of the components of FIG. 1 may represent circuitry that is wired to perform the specific logical functions in the process. Still further, any components of FIG. 1 may be stand-alone or separate computing devices (such as that described in FIG. 12 below), or alternatively combined as one computing device, for example.

The shot detection and recognition engine 102 receives a video input and classifies frames for each shot in the video. In one embodiment, the shot detection and recognition engine 102 detects scene changes and categorizes an instructional video input into two general frame types; non-content frames and content frames. Non-content frames may include data such as a talking head or still images. Content frames may include data such as handwriting, slideshows, or other textual images.

After the frames in the video input have been categorized, the non-content frames quality assessment engine 104 analyzes the non-content frames to provide an objective non-content frame quality measure for each of the non-content frames. Analogously, the content frames quality assessment engine 106 analyzes the content frames and provides an objective content frame quality measure for each of the content frames. Once objective quality measures have been determined for the content frames and the non-content frames, the video frames selection engine 108 selects frames based on the objective measures and outputs selected frames to the video capsule engine 110. The video capsule creation engine 110 organizes the selected frames and synchronizes audio from the video input to create a video capsule from the video input.

Figure 2A:
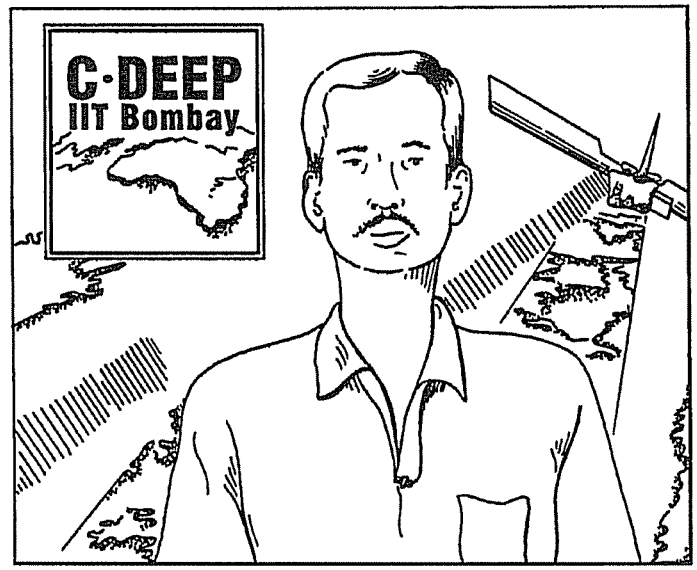
FIG. 2($a$)-($d$) illustrates examples of non-content frames and content frames that can be found in instructional videos.

FIGS. 2(a)-2(d) illustrate examples of data within non-content frames and content frames that may be found in instructional videos. FIG. 2(a) shows an example of a non-content frame that includes a talking head image. For example, the video is a recording of a person speaking to show a viewer the appearance of the speaker and to simulate a presence at the lecture.

Figure 2B:
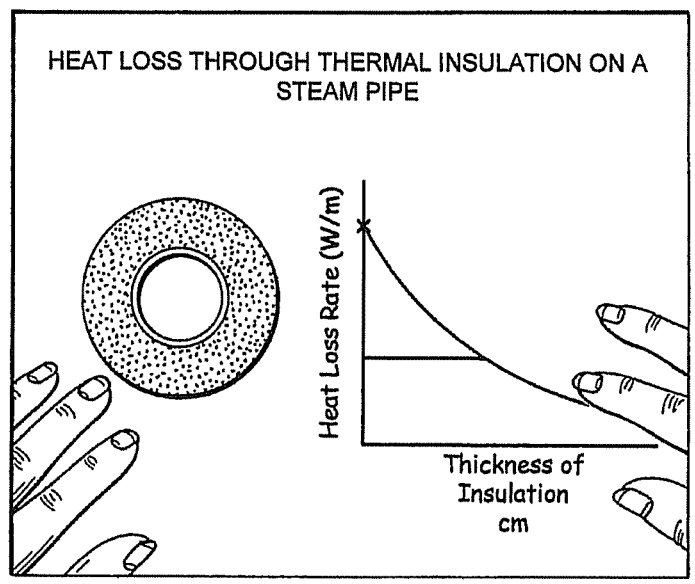

FIGS. 2(b)-2(d) illustrate examples of content frames. FIG. 2(b) includes data that has images, textual data, and a writing hand. FIG. 2(c) includes data representative of a slide show, such as an electronic data slideshow produced using Power-Point software provided by Microsoft® Office, for example. FIG. 2(d) includes data that is handwritten, for example.

A lecture video generally includes sequences of a talking head, a writing hand, a slide show, audience (discussion), and a demonstration (imported video). In exemplary embodiments, the video is temporally segmented to detect scene changes. Then activities in the segments are recognized/classified.

To temporally segment a video, the shot detection and recognition engine 102 of FIG. 1 detects scene changes and recognizes activities in the video segment frames. The temporal segmentation may be accomplished using histogram differences D(t) given by:

$$D(t) = \sum_{i=0}^{255} |h_t(i) - h_{t-1}(i)| \quad (1)$$

where $h_t$ is a normalized intensity histogram of a current frame and $h_{t-1}$ is that of the previous frame. In one embodiment, a number of data bins for the histogram is $2^b$, where b is the number of bits used to represent a pixel value. For example, for 8 bit images, the number of data bins is 256. A 256 level histogram may first be converted to a 16-bin histogram by grouping adjacent sets of 16 bins to improve the speed of computation, for example.

If the sum of the absolute difference of the histograms, expressed in Equation (1), crosses a threshold, a corresponding frame can be declared as a shot-boundary frame, which indicates a scene change, for example. In the case of instructional videos, temporal segmentation based on histogram differences can be used due to generally little camera movement in instructional videos. As a result, scene changes can be reliably detected. Video segments between two consecutive scene change points are referred to as video paragraphs, and are the portions of the video that are to be classified, for example. Thus, scene change points are used to divide the video into segments, which are each then classified appropriately.

Figure 3:
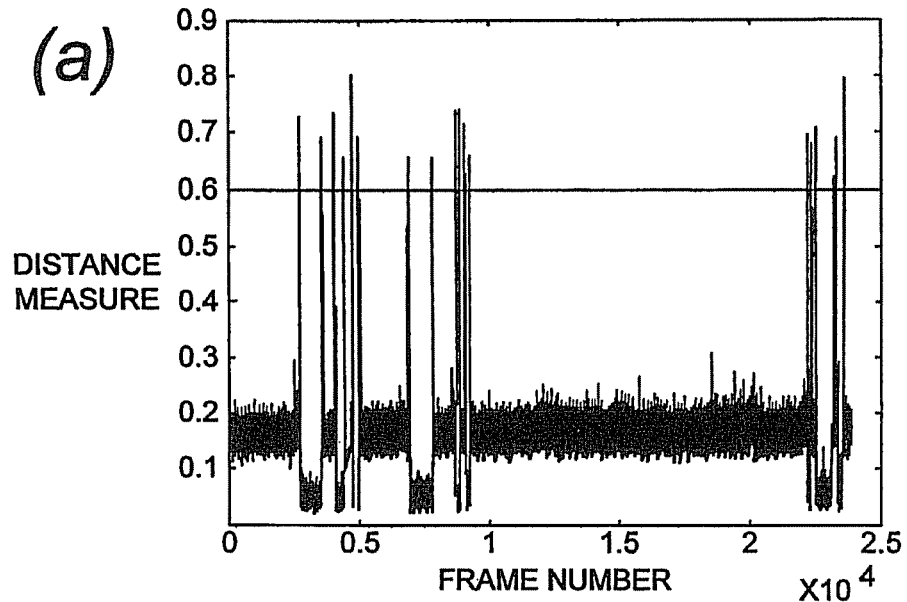
FIG. 3($a$)-($b$) illustrates example plots of histogram difference measures for an example lecture video containing printed slides and handwritten slides, and an example lecture containing writing hand segments.
Figure 3:
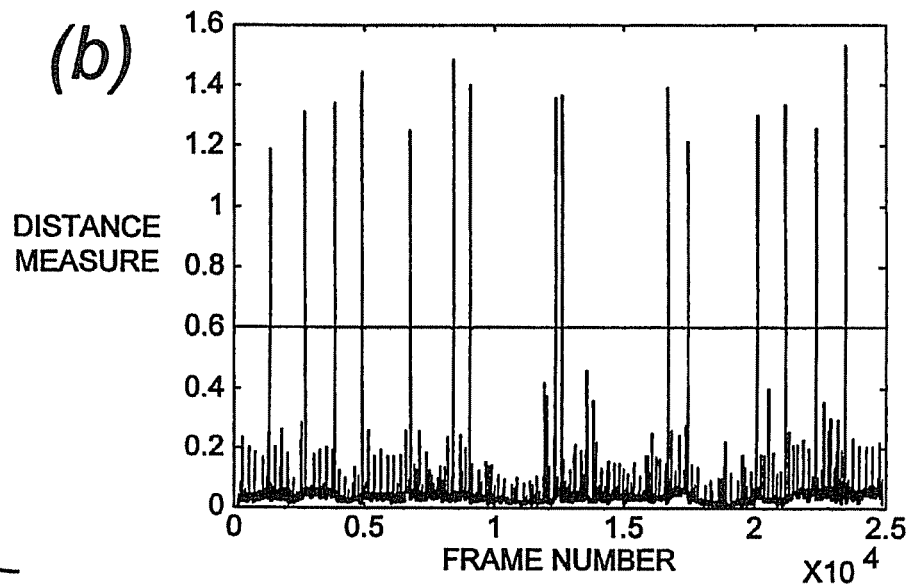

FIG. 3(a) illustrates an example plot of histogram difference measures for an example lecture video including printed slides and handwritten slides. Peaks in the histogram difference plots represent possible scene changes, and the horizontal line represents a threshold used for detecting scene changes. Thus, if a peak in the histogram difference plot crosses the threshold, then a scene change is noted for the frame. Similarly, FIG. 3(b) illustrates an example plot of histogram difference measures for an example lecture video containing writing hand segments. Again, the peaks represent possible scene changes, and the horizontal line represents the threshold used for detecting scene changes.

The shot detection and recognition engine 102 may categorize frames of a video using Hidden Markov Models (HMMs). HMM-based activity recognition includes two phases, namely a training phase and a testing phase. In the training phase, a model is generated that describes or defines content frames vs. non-content frames. In the testing phase, frames of the video are compared against the models to classify the frames as content frames or non-content frames.

A frame sequence I={$I_1, I_2, \ldots, I_T$} may be transformed into an observation sequence X={$X_1, X_2, \ldots, X_T$} for the training phase of an HMM. In the observation sequence, $X_n$={$x_{1,n}, x_{2,n} \ldots, x_{D,n}$}, wherein $x_1, x_2, \ldots x_n$ are frame features and D is the number of dimensions of the feature used. In the case of a video frame shot, D could be as low as two and depends on the number of features used to represent an observation. In the training phase, each category of instructional activities has a feature vector $x_i \in R^n$ extracted for each frame $I_i$ from which probability density functions can be constructed. As discussed before, the different instructional activities may be categorized as a talking head frame, a writing hand frame, or a slide show frame, for example. In the case of a talking head non-content frame, significant motion may be more prevalent than that of writing hand or slide show content frames. Accordingly, energy of the temporal derivative in intensity space can be used as a relevant identifier, and can be described by the equation:

$$x_1(t) = \sum_{m=1}^{M} \sum_{n=1}^{N} (F_t(m,n) - F_{t-1}(m,n))^2 \quad (2)$$

where $F_t$ is a pixel intensity value of a current video frame, $F_{t-1}$ is a pixel intensity value of a previous video frame, M is a number of vertical pixels and N is a number of horizontal pixels in the video frame. Note that conversion of a color image to gray scale is not unique and different weighting of color channels may be required. For example, one conversion may be: Y=0.299*R+0.587*G+0.114*B, where Y is a pixel intensity value and R, G & B are the color values.

The normalized intensity histogram $h_t(i)$ gives a distribution of image pixels over different intensity values. As such, the histogram may be sparse for the slide show category, moderately sparse for the writing hand category and rather dense for the talking head category. As such, entropy of frame histograms can be utilized as another indicator for detection and recognition of different instructional activities, and can be used to categorize frames. This feature can be described by the equation:

$$x_2(t) = -\sum_{i=0}^{255} h_t(i) \log(h_t(i)). \quad (3)$$

The HMM may be implemented with a Gaussian mixture model (GMM) assumption having, for example, two states, and a Baum-Welch algorithm may be used for determining the HMM parameters. Without reference information, the HMM parameters may be set initially using random values for each category of instructional activities, and an expectation-maximization (EM) algorithm can be used to generate well-tuned parameters for each category within a few iterations. Hence, a definite number of HMMs is used, and each represents different classes of instructional activities, such as a talking head, writing hand, or slide show. Since each of these are trained using the features extracted from the corresponding categories of activities, the HMMs are capable of classifying a test input.

For the recognition phase, the same features as discussed above (e.g., energy of the temporal derivative in intensity space and entropy of frame histograms) can be extracted in a similar fashion from each frame in the frame sequence of the test data. These features are then compared against the models implemented based on those same features for each category of instructional activities. Based on these comparisons, the frames can each be categorized according to the models that best match the extracted features. Thus, the shot detection and recognition engine 102 can classify frames as content or non-content frames using these indicators. Other types of indicators may be used as well.

After frames have been classified, the non-content frames quality assessment step 104 analyzes the non-content frames and provides an objective non-content frame quality measure for each of the non-content frames. The talking head, non-content frame segments may be important aspects of an instructional video, and thus, may be represented in the corresponding video capsule. Selection of talking head frames for the video capsule can be accomplished using an objective, no-reference perceptual quality assessment method (e.g., a best quality of an image is unknown, and thus, the method is referred to as a no-reference quality assessment method).

For this method, blurring and blocking effects are considered significant artifacts generated during an image compression process. For example, compressed images usually contain blocking artifacts, which are small square blocks all over the image. And, blurring artifacts are those by which an image is smoothened such that shape information can be correctly retained, but details may be lost. Detection of blocking artifacts can be achieved by measuring a difference signal along each horizontal line, given by the equation:

$$d_h(m,n) = F(m,n+1) - F(m,n), n \in [1, N-1] \quad (4)$$

for a frame F(m, n) having dimensions M by N, and where $m \in [1, M]$ and $n \in [1, N]$. Accordingly, a measure of the horizontal blocking artifacts can be estimated as an average of differences across block boundaries $B_h$, given by the equation:

$$B_h = \frac{1}{M[(N/8)-1]} \sum_{i=1}^{M} \sum_{j=1}^{(N/8)-1} |d_h(i, 8j)|. \quad (5)$$

Blurring artifacts may lead to reductions in signal activity, therefore, combining the measure of blocking artifacts and the measure of signal activity can be accomplished to address relative blurring artifacts in the frame. The measure of signal activity can be achieved using two factors. The first factor is an average absolute difference $A_h$ between in-block image samples, given by the equation:

$$A_h = \frac{1}{7}\left(\frac{8}{M[N-1]}\sum_{i=1}^{M}\sum_{j=1}^{N-1}|d_h(i,j)| - B_h\right) \quad (6)$$

The second factor is a zero-crossing (ZC) rate, defined as:

$$z_h(m, n) = \begin{cases} 1; & \text{for horizontal ZC at } d_h(m, n) \\ 0; & \text{otherwise} \end{cases} \quad (7)$$

for $n \in [1, N-2]$. The horizontal zero-crossing rate is accordingly estimated as:

$$Z_h = \frac{1}{M[N-2]}\sum_{i=1}^{M}\sum_{j=1}^{N-2} z_h(i, j). \quad (8)$$

An analogous procedure can be used to calculate vertical blocking artifacts $B_v$ and vertical blurring artifacts $A_v$ and $Z_v$. The horizontal and vertical artifact components may then be combined as:

$$B = \frac{B_h + B_v}{2}, \quad A = \frac{A_h + A_v}{2}, \quad Z = \frac{Z_h + Z_v}{2}. \quad (9)$$

Finally, a quality score based on results from equations (5), (6), (8) and (9) can be formulated as:

$$QS_N = a + bB^{c_1}A^{c_2}Z^{c_3} \quad (10)$$

where the parameters $a, b, c_1, c_2$ and $c_3$ can be estimated using subjective test data. These parameters are of a visual quality assessment method, and examples are provided in Z. Wang, H. R. Sheikh, and A. C. Bovik, "No-reference perceptual quality assessment of JPEG compressed images," Proc. IEEE International Conference on Image Processing, pp. 477-480, September 2002, the entire contents of which are incorporated by reference herein. Example values of these parameters are $a=245.9$, $b=261.9$, $c_1=0.0240$, $c_2=0.0160$, $c_3=0.0064$. Using results from these calculations, no-reference perceptual quality scores may be assigned to the non-content frames representing the talking head portion of the instructional video. The frame sequence positions or indices associated with non-content frames having high quality scores may then be marked and outputted to the video frames selection engine 108 of FIG. 1.

Figure 4A:
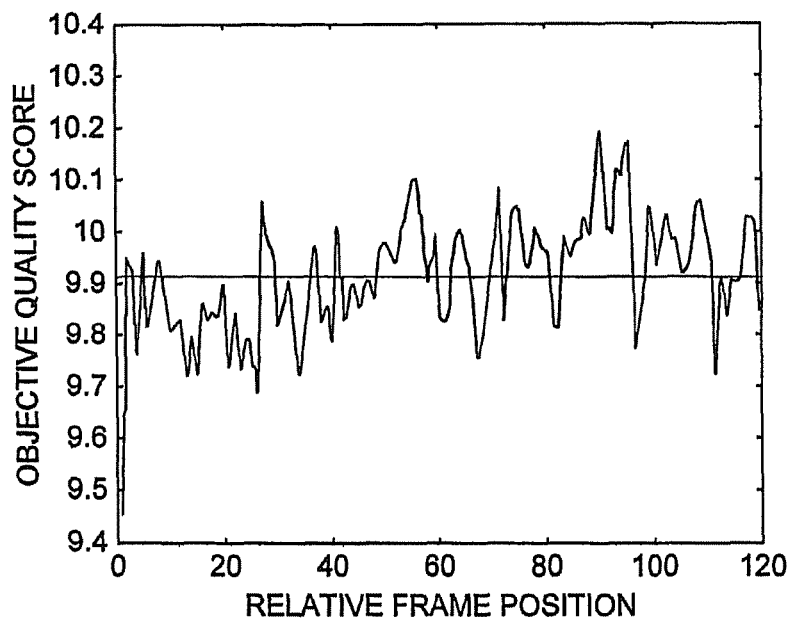
FIG. 4($a$)-($d$) illustrates an example plot of example quality scores for an example talking heads frame sequence and the frame corresponding to the highest quality score.
Figure 4B:
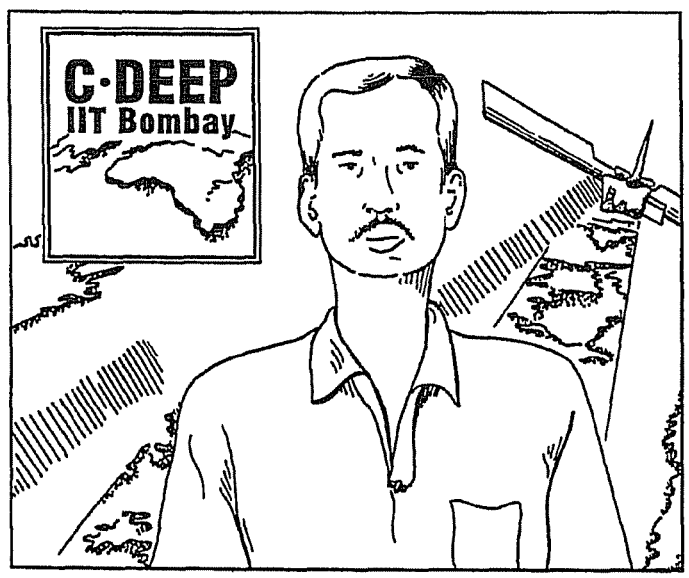
Figure 4C:
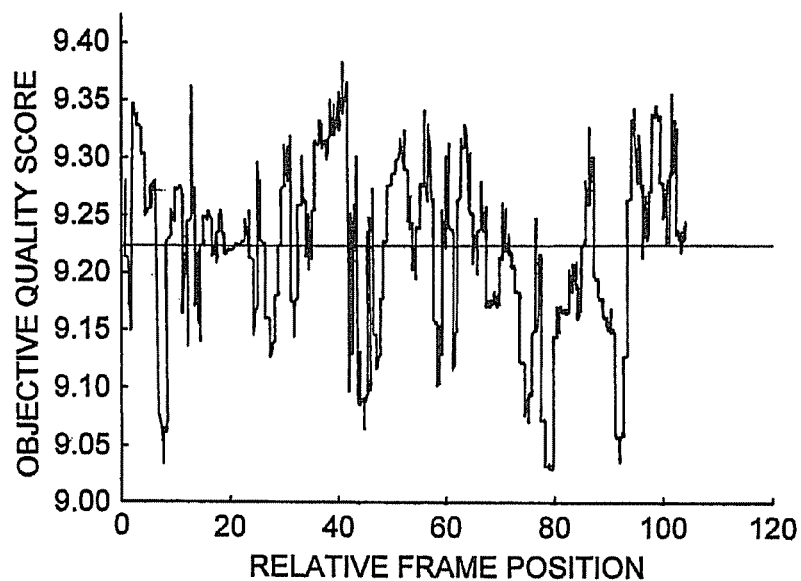
Figure 4D:
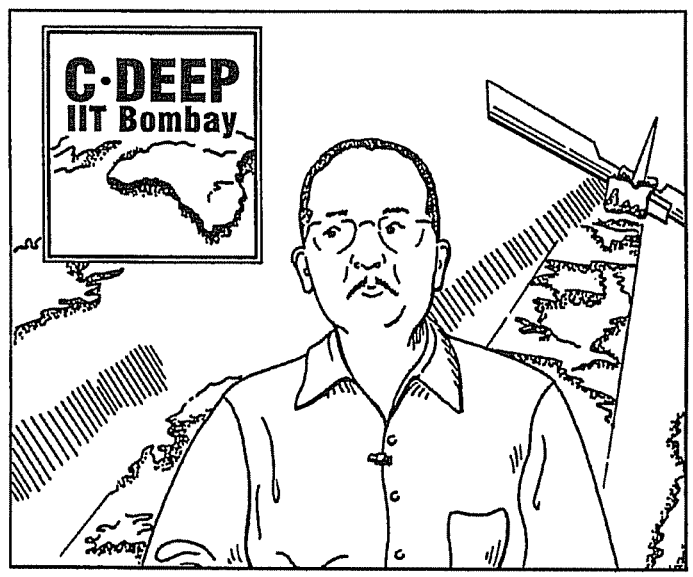

FIG. 4(a) is an example plot of no-reference objective measures based on quality assessments for an example non-content frame sequence and FIG. 4(b) is an illustrative example of the corresponding non-content talking head frame with a highest corresponding quality score. Similarly, FIG. 4(c) is another example plot of no-reference objective measures based on quality assessments for an example non-content frame sequence and FIG. 4(d) is an illustrative example of the corresponding non-content talking head frame with a highest corresponding quality score. Thus, in one embodiment, content frames that correspond to peaks or local peaks are selected as having a high quality score and can be used in the resulting video clip.

Figure 5:
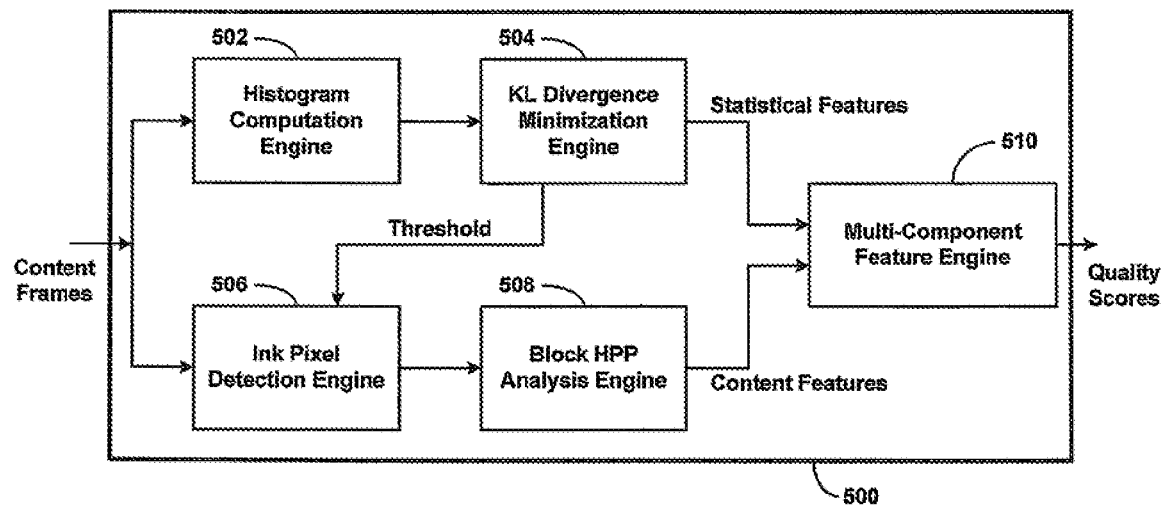
FIG. 5 is an illustrative block diagram of a content frames quality assessment system, which may be implemented as the content frames quality assessment engine shown in FIG. 1.

Analogous to the non-content frames quality assessment engine 104, the content frames quality assessment engine 106 analyzes the content frames and provides an objective content frame quality measure for each of the content frames. FIG. 5 is an example block diagram of a content frames quality assessment system 500, which may be implemented as the content frames quality assessment engine 106 as shown in FIG. 1.

The content frames quality assessment system 500 includes a histogram computation engine 502, a Kuliback Leibler (KL) divergence minimization engine 504, an ink pixel detection engine 506, a block horizontal projection profile (HPP) analysis engine 508, and a multi-component feature engine 510.

The histogram computation engine 502 and the ink pixel detection engine 506 receive content frames from the shot detection and recognition engine 102 of FIG. 1. The histogram computation engine 502 computes histograms for each frame and sends the histogram data to the KL divergence minimization engine 504. The KL divergence minimization engine 504 outputs statistical features to the multi-component feature engine 510. The KL divergence minimization engine 504 also outputs threshold values to the ink pixel detection engine 506. Based on the threshold value, the ink pixel detection engine 506 processes the content frame inputs and provides an output to the block HPP analysis engine 508. After the block HPP analysis engine 508 provides an output to the multi-component feature engine 510, the multi-component feature engine 510 generates quality scores for each of the inputted content frames.

The histogram computation engine 502 converts the received content frame to gray scale after which a histogram h(i) is computed. The histogram may be modeled by a bimodal GMM with a corresponding pair distribution function:

$$p(i) = \frac{\epsilon}{\sqrt{2\pi}\sigma_1}e^{-\frac{1}{2}\left(\frac{i-\mu_1}{\sigma_1}\right)^2} + \frac{1-\epsilon}{\sqrt{2\pi}\sigma_2}e^{-\frac{1}{2}\left(\frac{i-\mu_2}{\sigma_2}\right)^2} \quad (11)$$

where i is an intensity level, $\epsilon$ is a proportion of a mixture of the two modes, $\mu_1$ is a foreground mean, $\mu_2$ is a background mean, $\sigma_1^2$ is a foreground variance, and $\sigma_2^2$ is a background variance. In one embodiment, the bimodal GMM includes one mode corresponding to ink pixels and another mode corresponding to other elements.

At the KL divergence minimization engine 504, the KL divergence J is minimized from an observed histogram h(i) to an unknown mixture distribution p(i). J can be given by:

$$J = \sum_{i=0}^{255} h(i)\log\left[\frac{h(i)}{p(i)}\right]. \quad (12)$$

and p(i) is described below. Because the numerator term h(i) in the logarithm is not dependent on the unknown parameters, the minimization step may be equivalent to minimizing an information measure Q, defined as:

$$Q = -\sum_{i=0}^{255} h(i)\log[p(i)]. \quad (13)$$

For performing the KL divergence minimization step, the two modes are considered to be separate. Given that T is a threshold value separating the two modes, the mixture distribution can be given as:

$$p(i) \approx \begin{cases} \dfrac{\epsilon}{\sqrt{2\pi}\sigma_1} e^{-\frac{1}{2}\left(\frac{i-\mu_1}{\sigma_1}\right)^2}; & 0 \leq i \leq T \\ \dfrac{1-\epsilon}{\sqrt{2\pi}\sigma_2} e^{-\frac{1}{2}\left(\frac{i-\mu_2}{\sigma_2}\right)^2}; & T < i \leq 255 \end{cases} \quad (14)$$

and $$Q(T) = \begin{array}{l} -\sum_{i=0}^{T} h(i)\log\left(\dfrac{\epsilon}{\sqrt{2\pi}\sigma_1}\right) e^{-\frac{1}{2}\left(\frac{i-\mu_1}{\sigma_1}\right)^2} \\ -\sum_{i=T+1}^{255} h(i)\log\left(\dfrac{1-\epsilon}{\sqrt{2\pi}\sigma_2}\right) e^{-\frac{1}{2}\left(\frac{i-\mu_2}{\sigma_2}\right)^2} \end{array}. \quad (15)$$

The KL divergence minimization accomplishes the goal of optimizing an estimation of parameters of a statistical model of a system. Here, this statistical model is that of the observed intensity histogram of the content video frame, for example.

Figure 6A:
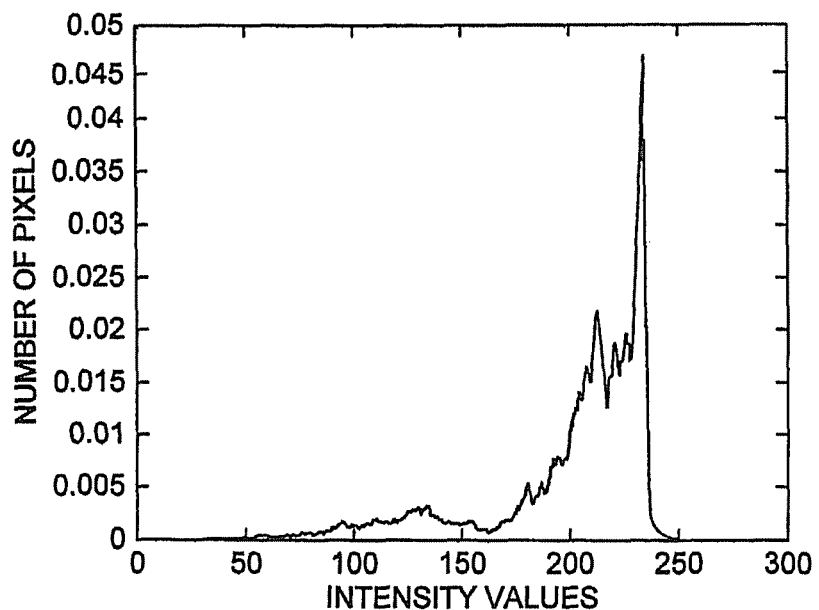
FIG. 6($a$)-($d$) illustrates example plots of an observed histogram for an example content frame, and the corresponding estimated histogram after KL divergence minimization.
Figure 6B:
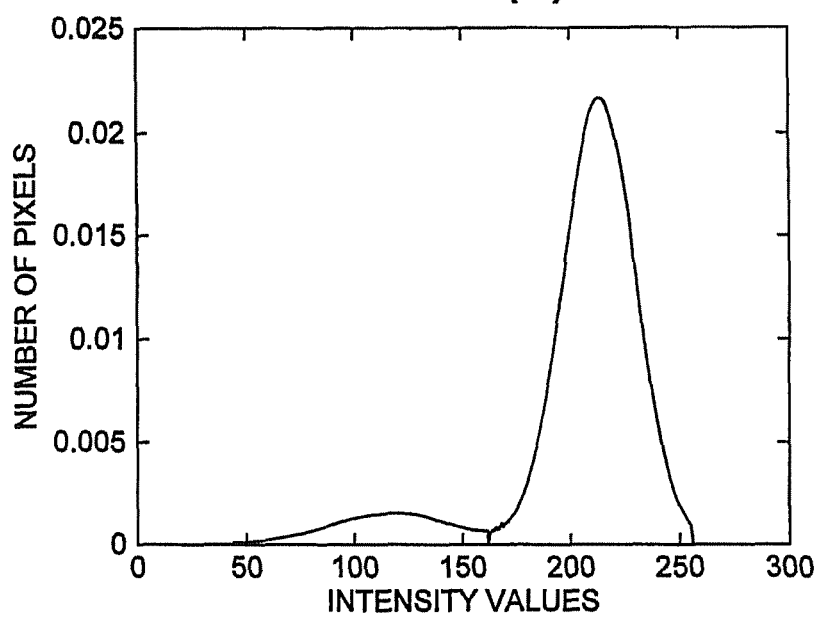
Figure 6C:
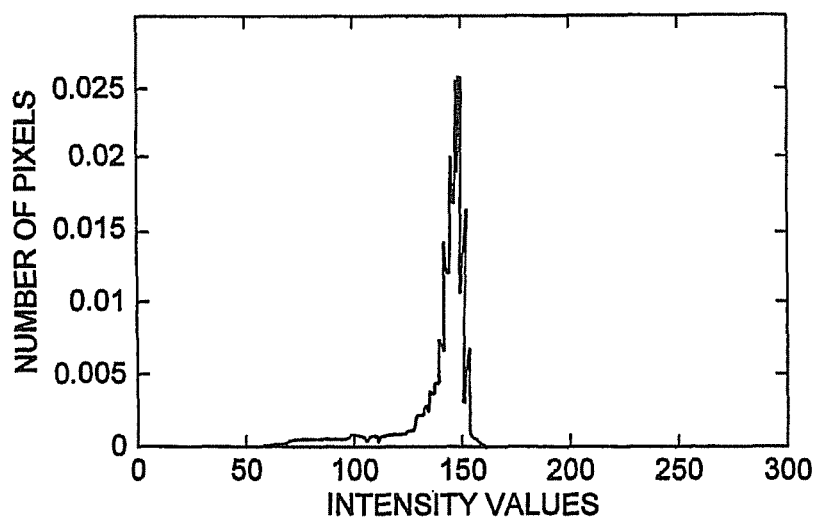
Figure 6D:
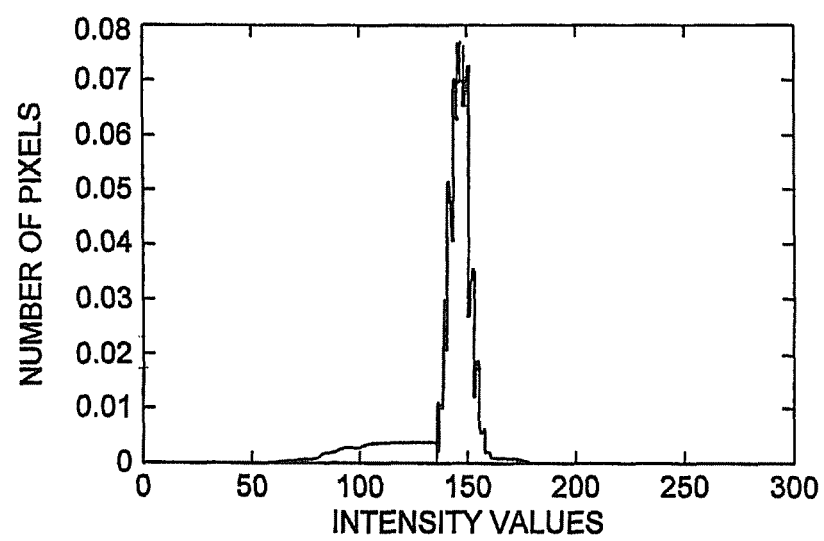

FIG. 6(a) is an example plot of an observed histogram for an example content frame, and FIG. 6(b) is an example plot of an estimated histogram corresponding to the observed histogram of FIG. 6(a) as a result of processing by the KL divergence minimization engine 504. Similarly, FIG. 6(c) is another example plot of an observed histogram for an example content frame, and FIG. 6(d) is another example plot of an estimated histogram corresponding to the observed histogram of FIG. 6(c) as a result of processing by the KL divergence minimization engine 504. Minimizing Q(T) with respect to $\{\mu_1,\sigma_1,\mu_2,\sigma_2,\epsilon,T\}$ provides statistical features outputted to the multi-component feature engine 510 and provides an optimum threshold to the ink pixel detection engine 506.

The optimum threshold value, T, can also be determined from FIG. 6(b). For example, the optimum threshold value may be approximately 162 for the figure shown in FIG. 6(b). The optimum threshold is at the valley point of the two modes of the estimated bimodal histogram.

Figure 7C:
FIG. 7($a$)-($d$) illustrates example images of content frames and their corresponding detected ink pixels based on an optimum threshold.
Figure 7C:
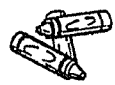
Figure 7D:
Figure 7D:

At the ink pixel detection engine 506, the optimum threshold provided by the KL divergence minimization engine 504 is used to distinguish between ink pixels and background pixels. FIG. 7 illustrates example images of content frames and corresponding detected ink pixels based on the optimum threshold. FIG. 7(a) is an example image of content in a handwritten slide frame, and FIG. 7(b) shows the corresponding detected ink pixels. Similarly, FIG. 7(c) is an example image of content in a printed slide frame and FIG. 7(d) shows the corresponding detected ink pixels. The ink pixel detection engine 506 may capture ink pixels, or alternatively, remove background pixels.

The means $\mu_1$ and $\mu_2$, and variances $\sigma_1^2$ and $\sigma_2^2$ of the foreground and background, respectively, of content frames may be used as statistical features to define a quality of a content frame based on a mean term C and a sigma term S, defined as:

$$C = \frac{|\mu_2 - \mu_1|}{255} \quad (16)$$

$$S = \frac{1}{\sigma_1 + \sigma_2} \quad (17)$$

The mean term C and sigma term S may be used as features for a statistical assessment of content frames. To include an assessment of a spatial arrangement of content in the frames, an HPP-based method may be used.

At the HPP analysis engine 508, the content frame is partitioned into m by n equal blocks. In one embodiment, the content frame may be partitioned into 8 by 4 equal blocks. Partitioning into blocks addresses the extent to which the content frame is uniformly filled across an entire document page by ink pixels. For each of the m by n blocks, an HPP is constructed by summing a number of ink pixels in each row of the block along a horizontal axis. An array $F_b$ of K elements is formed from the HPP construction and may be further normalized. The energy (or pixel density) for each HPP can be provided by the equation:

$$E_b = \frac{1}{K}\sum_{m=1}^{K} |F_b(m) - \hat{F}_b|^2; \quad (18)$$

$$b = 1, 2, \ldots, 32$$

where $E_b$ is the energy of the HPP $F_b(m)$ of a block b in the example 8 by 4 array of equal blocks, and $\hat{F}_b$ is the average HPP value of the block b. Low energy values may indicate predominantly black or white patches, while high energy values may indicate well-written blocks. The total energy of the 8 by 4 array of equal blocks can be given by:

$$E = \sum_{b=1}^{m \times n} E_b \quad (19)$$

which may then be used as a measure of content frame quality.

The average HPP value of the block b, $\hat{F}_b$, may further be used as a factor that diminishes a quality score of content frames with occluding patches such as hands or picture-in-pictures. This may be accomplished by performing inter-block comparisons with the following difference calculation:

$$d = \max_{b} \hat{F}_b - \min_{b} \hat{F}_b \quad (20)$$

If the value of d is small, the blocks may be considered clean and free from occluding patches. On the other hand, if the value of d is high, there is higher probability that one or more occluding patches are present in the content frame. An example of a small d value is 0.1, and an example of a high d value is 0.8. In one embodiment, a value:

$$G = 1/d \quad (21)$$

may be used as the measure of quality such that a higher value represents a higher quality frame. The energy and difference values may be used as content features to help define a quality of content frames that is provided to the multi-component feature engine 510.

Figures 8D, 8E, 8F:
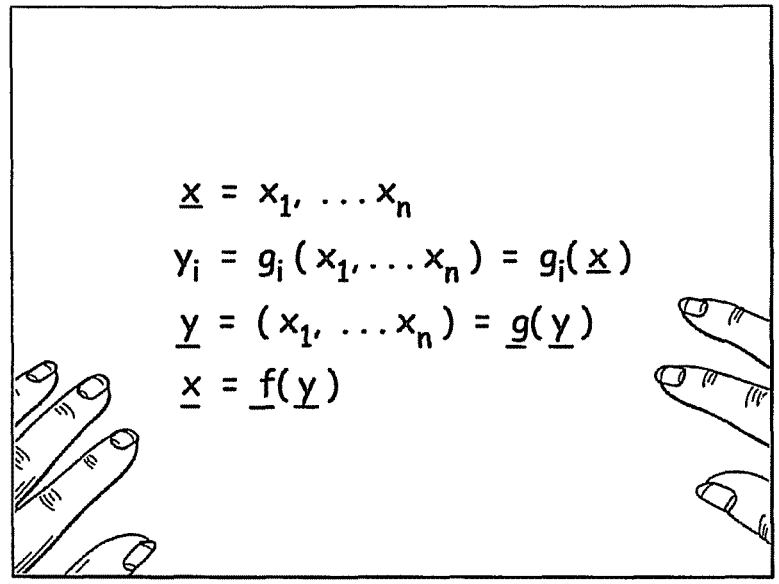
FIG. 8($a$)-($f$) illustrates example results from the block HPP analysis engine of FIG. 5.

FIG. 8 illustrates two sets of example results from the block HPP engine 508. FIG. 8(a) illustrates an example image of a high quality content frame, FIG. 8(b) shows example corresponding 8 by 4 average HPP values (as derived from Equation (18)), and FIG. 8(c) shows example corresponding 8 by 4 block HPP energies (as derived from Equation (19)). Analogously, FIG. 8(d) illustrates an example image of a low quality content frame, FIG. 8(e) shows the corresponding 8 by 4 average HPP values, and FIG. 8(f) shows the corresponding 8 by 4 block HPP energies. Note that a white patch or block of data in the frame results in an average HPP value of 1 and a resultant HPP energy of 0, as seen in FIGS. 8(d)-(f). Thus, using the HPP data, slides that include mainly little or no white space can be selected, for example.

The multi-component feature engine 510 receives the statistical features output from the KL divergence engine 504 and the content features output from the HPP analysis engine 508 and using a weighted sum of the results from equations (16), (17), (19) and (21), provides a quality score given by:

$$QS_C = \alpha_1 E + \alpha_2 S + \alpha_3 C + \alpha_4 G \qquad (22)$$

where the weights $\alpha_i$s are estimated using subjective test data of content frames. Subjective test data are selected from a standard corpus of lecture video frames. This will contain several frames from different lecture video sequences with all possible categories of instructional activities. This serves as a reference database for any performance analysis. Example values of the weights $\alpha_i$s are: $\alpha_1=1$, $\alpha_2=50$, $\alpha_3=4$ and $\alpha_4=0.4$. Using results from these calculations, no-reference perceptual quality scores may be assigned to the content frames representing the writing hand and slide show segments of the instructional video.

Figure 9A:
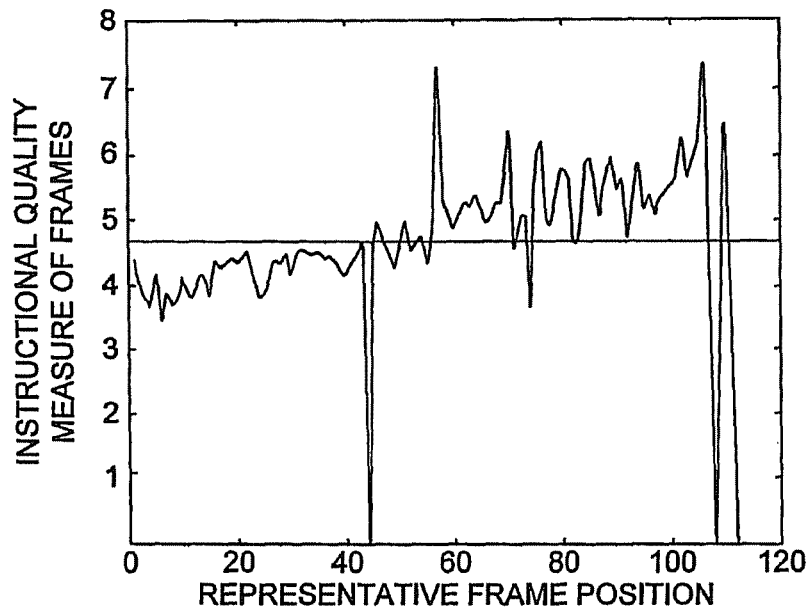
FIG. 9($a$)-($d$) illustrates an example plot of quality scores for an example handwritten frame sequence and the frame corresponding to the highest quality score.
Figure 9B:
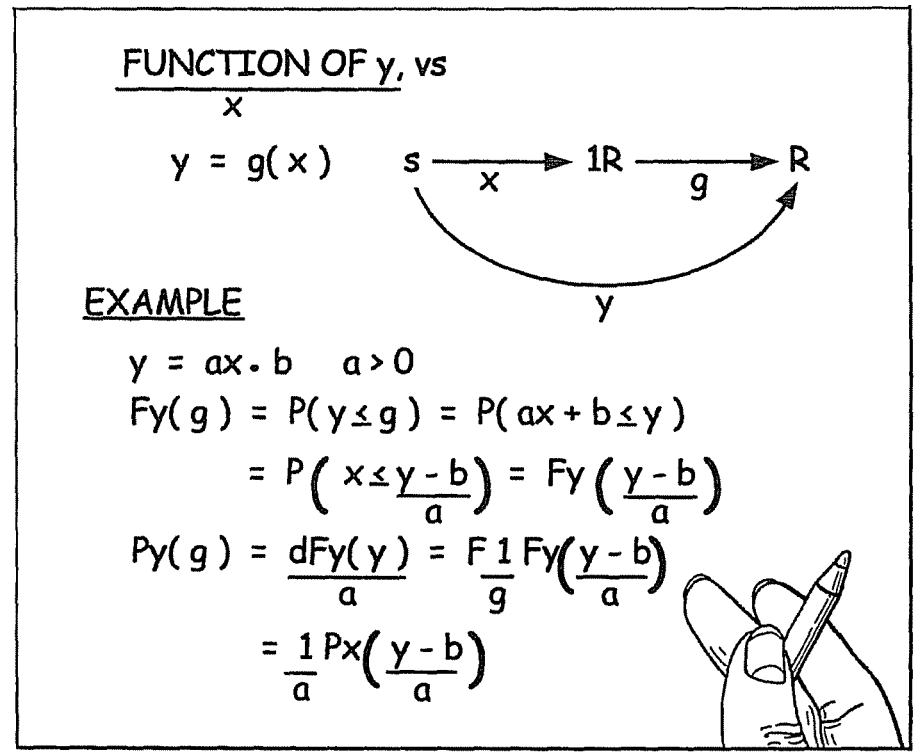

In one embodiment, the multi-component feature engine 510 is a 4-component feature engine including components based on energy (E), mean (C), variance (S) and difference (G). FIG. 9(a) illustrates an example plot of quality scores (derived from Equation (22)) for an example handwritten frame sequence, and FIG. 9(b) shows a frame from the example handwritten frame sequence with the highest quality score. FIG. 9(c) illustrates another example plot of quality scores (derived from Equation (22)) for an example handwritten frame sequence, and FIG. 9(d) shows a frame from the example handwritten frame sequence with the highest quality score.

Figure 10A:
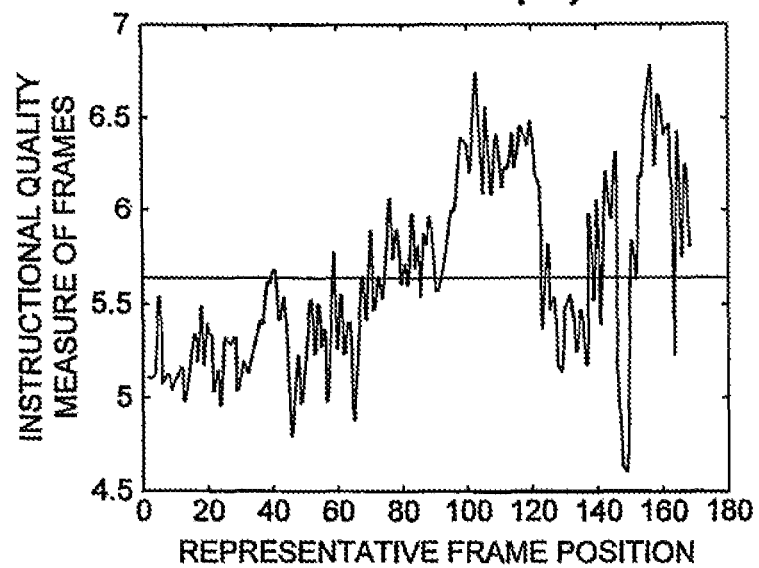
FIG. 10($a$)-($d$) illustrates an example plot of quality scores for an example slide show frame sequence and the frame corresponding to the highest quality score.
Figure 10B:
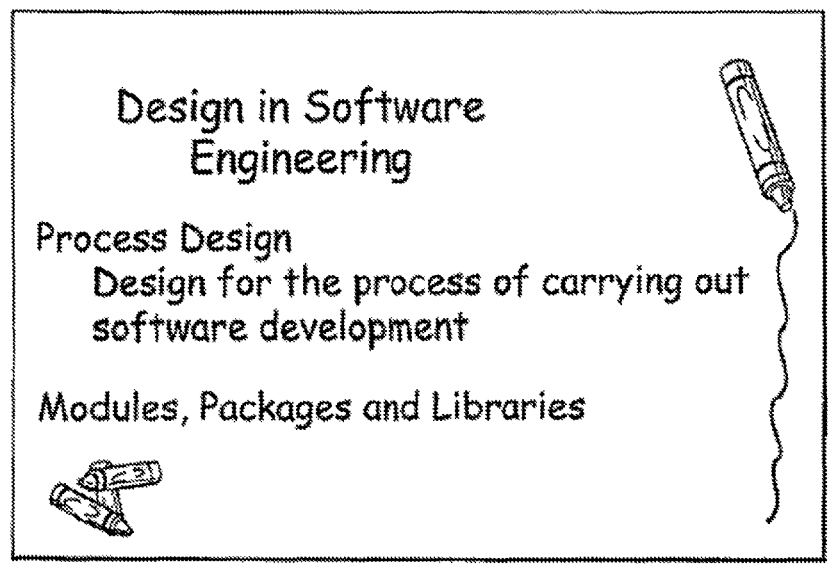
Figure 10C:
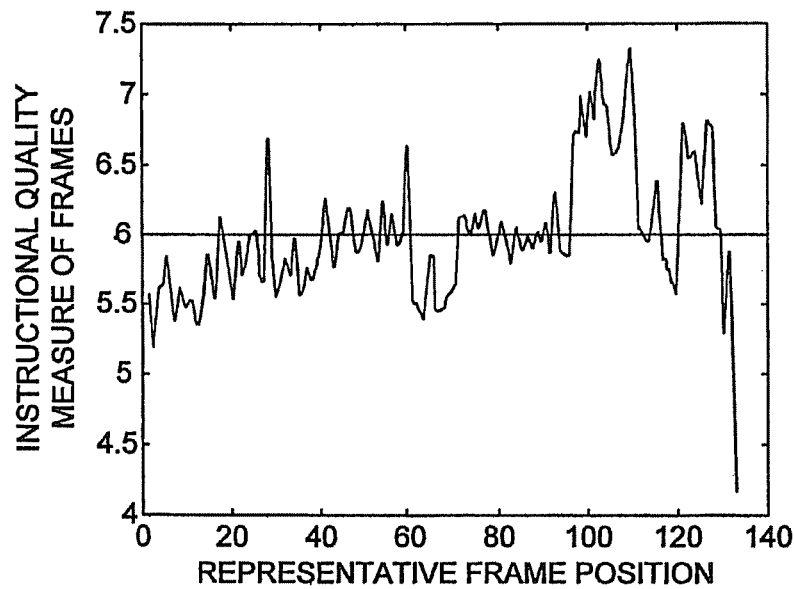
Figure 10D:
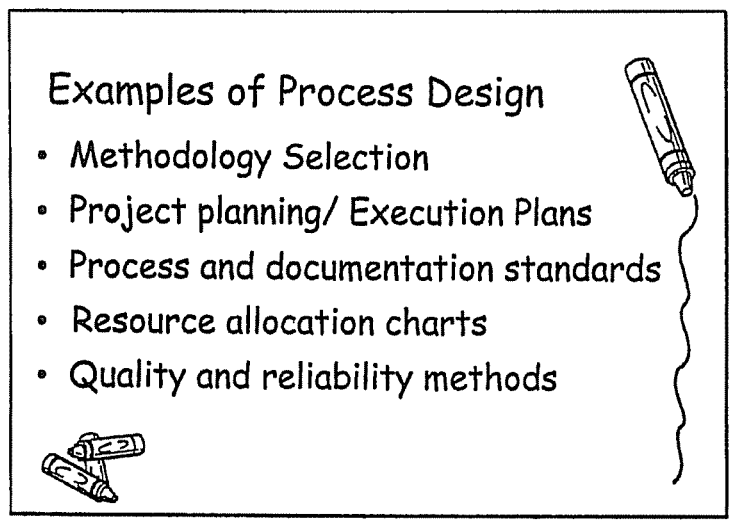

FIG. 10(a) illustrates an example plot of quality scores for an example slide show frame sequence, and FIG. 10(b) shows a frame from the example slide show frame sequence with the highest quality score. Similarly, FIG. 10(c) illustrates another example plot of quality scores for an example slide show frame sequence, and FIG. 10(d) shows a frame from the example slide show frame sequence with the highest quality score. The frame sequence positions or indices associated with content frames that have high quality scores may then be marked and outputted to the video frames selection engine 108.

The video frames selection engine 108 of FIG. 1 receives quality scores for non-content frames and content frames from the non-content frames quality assessment step 104 and the content frames quality assessment step 106, respectively, and selects high quality video segments used for creating the video capsule. The video frames selection engine 108 may vary its selection formula based on user input and/or general rules. In one embodiment, the video frame selection engine 108 may simply select high quality frames with the top six scores, for example. In another embodiment, the video frames selection engine 108 may select at least one video segment from each instruction activity category. For example, each of a segment including talking head non-content frames, a segment including writing hand content frames, and a segment including slide show content frames may be required. In yet another embodiment, only the top non-content frame is selected, while the remaining frames selected are content frames. For example, a single talking head non-content frame can be selected, while two writing hands content frames and two slide show content frames are selected.

Still further, the video frames selection engine 108 may select the video segment corresponding to 10 second window around a high quality frame for one highlight (clip). A total number of such video highlights (clips) may vary from 10-12 for a one hour lecture video. The proportion of the three activities (e.g., talking head, writing hand, slideshow) may be 1:2:2 if all are present, or may be 1:3 if only 2 activities are present. Thus, first, a high quality frame position (for both non-content & content classifications) is noted, then to select a 10 second video segment, approximately 250 frames around the high quality frame are selected (including audio). Next, such clips are selected in the above proportions. Note that from the same segment of instructional activity, more than one clip may be selected. If a one hour lecture video contains many small instructional scenes, even one clip may not be selected from a segment according to the score array, for example. The converse also holds, e.g., one video segment can contribute to more than one clip. The final proportion of this mixture may be such that all classes in the original video should receive appropriate representative temporal slots.

The video frames selection engine 108 outputs the selected frames (or indices of the selected frames) to the video capsule creation engine 110, which collects the selected high quality score video frames and further may select supplementing video frames corresponding to the selected high quality score video frames to form video clips (if the video frames selection engine 108 has not already done so). In one embodiment, video frames within ±5 seconds of the high quality score video frames are selected as supplementing video frames to form an approximate 10 second video clip, for example. Corresponding audio signals are synchronized with each of the video segments (according to indices of the selected frames), and a video capsule can be generated from full video inputs.

Thus, a location for high quality frames give the temporal marking around which the desired video clips are to be selected, along with the audio. On media re-creation, frames corresponding to a few seconds around the high quality frames are selected, provided there are no shot changes within this period, to produce the highlight. The choice of a 10 second long window may convey the instructional content to the viewer for a single highlight. The 10 second windows around each of the prominent local peaks in the quality measure are thus selected. As mentioned, on subjective evaluation, an appropriate temporal proportion of recognized classes during capsule preparation may be about 1:3 if there are only two classes, e.g., namely talking head and writing hand. If three classes occur (e.g., talking head, writing hand, and slide show), then an approximate ratio was found to be about 1:2:2.

For example, a first clip shown may be the talking head to show the instructor then the other two classes are shown in suitable proportions. The audio stream is kept synchronized with the visual data. Typically, a 1 hour video lecture may contain 10 to 12 video clips, each of about a 10 second duration, which yields a lecture video capsule of approximately 2 minutes.

When performing audio synchronization, if audio from a selected frame is of a poor quality, the selected frame may be dropped, and the next best quality frame may be used for clip selection. To assess the quality of audio, the audio can be examined to identify if long pauses or some other disturbance is present, for example.

Media re-creation may be performed using Flash (e.g., Adobe Flash player), and may produce Flash files to be "played" in a standalone Flash Player, or incorporated into a Projector (a self-executing Flash movie with a .exe extension in Windows), for example. Web pages that include Flash file content may include an Adobe Flash player or Flash plugin available from Adobe Systems Incorporated, to play out or execute the Flash file. The Flash player, developed and distributed by Adobe Systems, is a client application available for use in web browsers. Adobe Flash files have a variety of forms and can have an (swf) file extension, and would be considered a completed, compiled published file. Other Flash files, such as Flash video files, have an (fly) file extension and are utilized from within (swf) files. In addition, an (fla) file extension contains source material for the Flash application. Flash authoring software can edit (fla) files and compile the (fla) files into (swf) files. The flash compiler also provides for "tweening" (stands for "in between", referring to the middle frames Flash fills in) that eliminates the need to create minute variations for a moving graphic. Rather, the Flash compiler can take two graphics in an (fla) file and plot steps required to gradually move from the first to the second graphic. In addition, other file formats, such as .mov, .mpg, .avi for example, may also be used.

Figure 11:
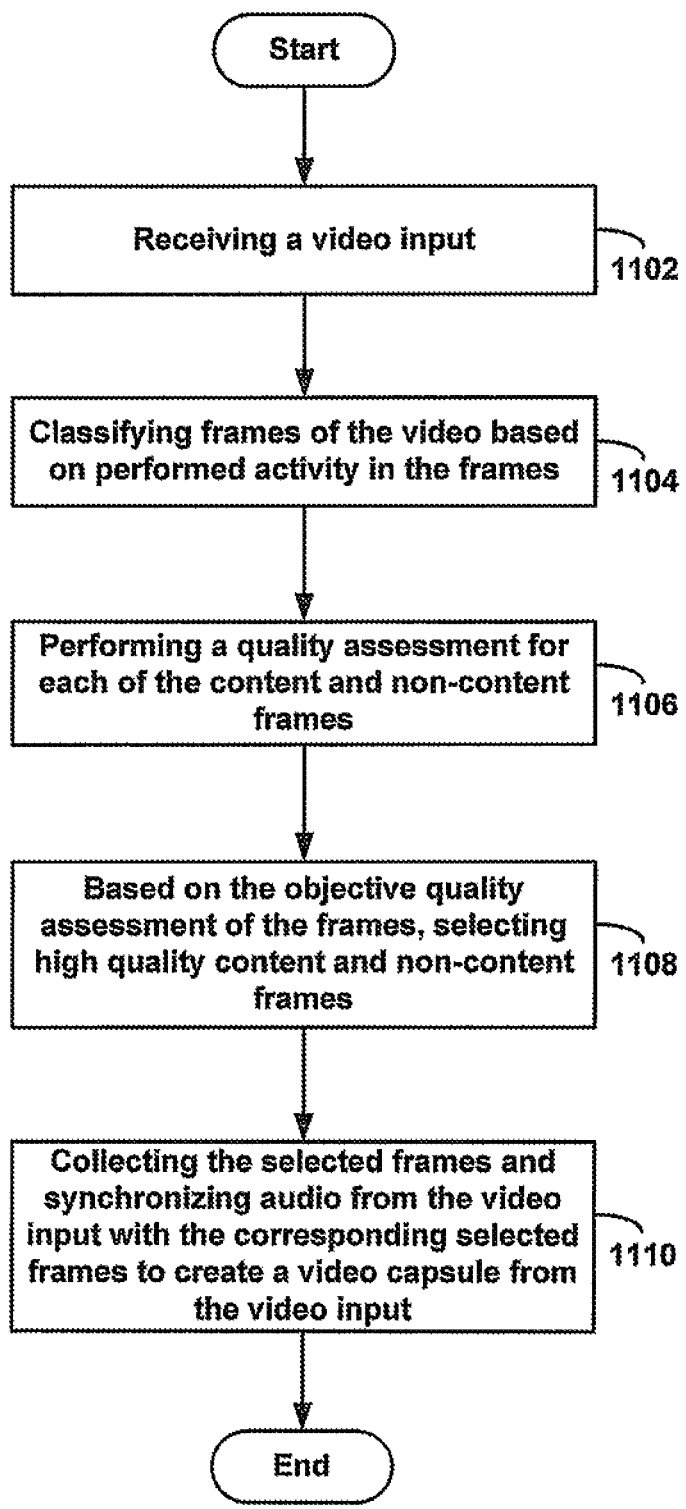
FIG. 11 is a flowchart depicting example functional steps to create a representation of a video that contains highlights of the video.

FIG. 11 is a flowchart that depicts example steps of a method for creating a representation of a video. It should be understood that the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. In addition, each block may represent circuitry that is wired to perform the specific logical functions in the process. Alternative implementations are included within the scope of the example embodiments of the present application in which functions may be executed out of order from that shown or discussed, including substantially concurrent or in reverse order, depending on the functionality involved, as would be understood by those reasonably skilled in the art.

As shown at block 1102, initially a video input is received. Following, frames of the video are classified based on content of the frames, as shown at block 1104. For example, the frames may be classified as content frames or non-content frames. Next, a quality assessment is performed for each of the content and non-content frames (or possibly for only a selected portion of the content and non-content frames), as shown at block 1106.

Based on the objective quality assessment of the frames, a select few of the high quality content and non-content frames are selected, as shown at block 1108. The frames may be selected so as to gather high quality frames that include desirable content (e.g., no white patches), and that include a variety of classes of frames (e.g., 1 non-content frame for every 2-3 content frames). Following, the selected frames are gathered and audio from the video input is synchronized with the corresponding frames to create a video capsule from the video input, as shown at block 1110.

The video input may be an instructional video lecture that includes a selected amount of types of frames, e.g., a talking head, a writing hand, and slideshow. With a limited number of possible types of frames, models are generated as to detect the frames, and to gather high quality frames from the video.

Once the video clip (or sometimes referred to as "trailer") is created, the video clip may be viewed by users to provide a preview of the entire video. For example, a viewer may view the video clip prior to downloading or purchasing the entire video.

Figure 12:
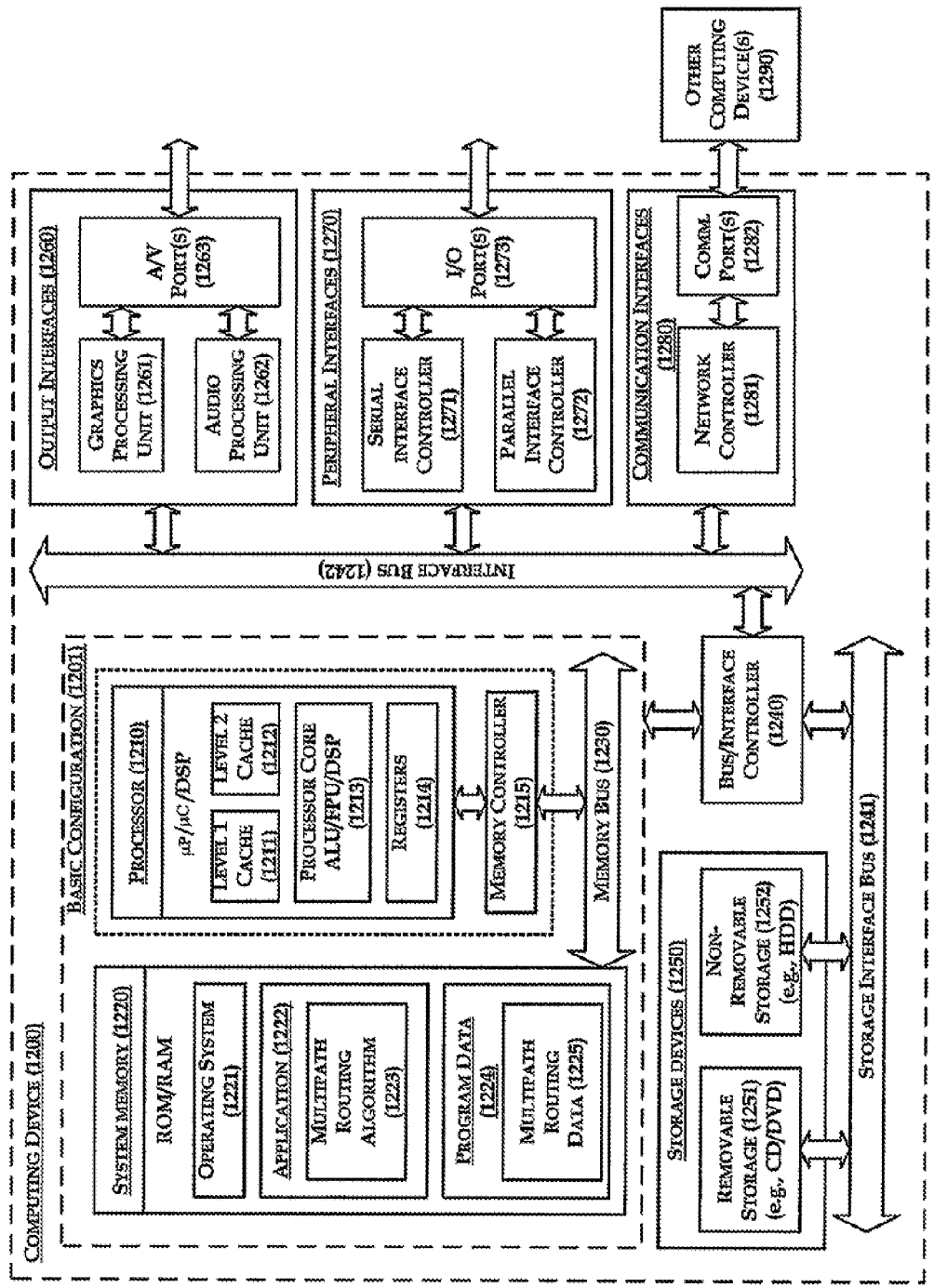
FIG. 12 is a block diagram illustrating an example computing device arranged for video capsule creation.

FIG. 12 is a block diagram illustrating an example computing device 1200 arranged for video capsule creation. In a very basic configuration 1201, computing device 1200 typically includes one or more processors 1210 and system memory 1220. A memory bus 1230 can be used for communicating between the processor 1210 and the system memory 1220.

Depending on the desired configuration, processor 1210 can be of any type including but not limited to a microprocessor (μP), a microcontroller (μC), a digital signal processor (DSP), or any combination thereof. Processor 1210 can include one more levels of caching, such as a level one cache 1211 and a level two cache 1212, a processor core 1213, and registers 1214. The processor core 1213 can include an arithmetic logic unit (ALU), a floating point unit (FPU), a digital signal processing core (DSP Core), or any combination thereof. A memory controller 1215 can also be used with the processor 1210, or in some implementations the memory controller 1215 can be an internal part of the processor 1210.

Depending on the desired configuration, the system memory 1220 can be of any type including but not limited to volatile memory (such as RAM), non-volatile memory (such as ROM, flash memory, etc.) or any combination thereof. System memory 1220 typically includes an operating system 1221, one or more applications 1222, and program data 1224. Application 1222 includes frame recognition, assessment and video capsule creation algorithms 1223 that may be arranged to create a video capsule from a video input. Program Data 1224 includes multipath routing data 1225 that is useful for calculating objective assessment values, as will be further described below. In some example embodiments, application 1222 can be arranged to operate with program data 1224 on an operating system 1221 such that different video capsule creation features may be incorporated according to user input parameters. This described basic configuration is illustrated in FIG. 12 by those components within dashed line 1201.

Computing device 1200 can have additional features or functionality, and additional interfaces to facilitate communications between the basic configuration 1201 and any required devices and interfaces. For example, a bus/interface controller 1240 can be used to facilitate communications between the basic configuration 1201 and one or more data storage devices 1250 via a storage interface bus 1241. The data storage devices 1250 can be removable storage devices 1251, non-removable storage devices 1252, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data.

System memory 1220, removable storage 1251 and non-removable storage 1252 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1200. Any such computer storage media can be part of device 1200.

Computing device 1200 can also include an interface bus 1242 for facilitating communication from various interface devices (e.g., output interfaces, peripheral interfaces, and communication interfaces) to the basic configuration 1201 via the bus/interface controller 1240. Example output interfaces 1270 include a graphics processing unit 1261 and an audio processing unit 1262, which can be configured to communicate to various external devices such as a display or speakers via one or more A/V ports 1263. Example peripheral interfaces 1260 include a serial interface controller 1271 or a parallel interface controller 1272, which can be configured to communicate with external devices such as input devices (e.g., keyboard, mouse, pen, voice input device, touch input device, etc.) or other peripheral devices (e.g., printer, scanner, etc.) via one or more I/O ports 1273. An example communication interface 1280 includes a network controller 1281, which can be arranged to facilitate communications with one or more other computing devices 1290 over a network communication via one or more communication ports 1282. The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 1200 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 1200 can also be implemented as a personal computer including both laptop computer and non-laptop computer configurations.

Experimental results from creating video capsules of lecture videos of different instructors, each of 1 hour duration, are described below. The videos contained handwritten slides, computer generated slides, or both. The first phase of temporal segmentation effectively identified the scene breaks in the lecture video sequence. The plots of the histogram difference measure, obtained from two videos, are those as illustrated in FIGS. 3(a) and 3(b). The spikes in the plots represent the possible scene breaks. These are detected against a threshold to effect the segmentation. As can be seen, the histogram difference measure is effective as there is little camera and object movement. In the case of activity detection, the training of HMM was performed with the three classes of video activities as mentioned (e.g., talking head, writing hand, and slideshow), by which the HMM could effectively classify a given test sequence. Referring to FIG. 2 again, FIGS. 2(a), 2(b) and 2(c) give representative frames from talking head, writing hand and slide show sequences, respectively, used for training and FIG. 2(d) is a sample frame from a correctly detected activity of writing hand.

The results of no-reference objective measure based quality assessment for non-content frames are shown in FIG. 4. A given frame, e.g., frame #3414, is found to offer a best quality of the talking head for the first frame sequence and another frame, e.g., frame #1842, offers a best quality of the talking head for the second sequence. The parameters of the quality score evaluation, as given by Equation (10), obtained with all test images are a=245.9, b=261.9, $c_1$=0.0240, $c_2$=0.0160, $c_3$=0.0064.

In the case of content frames, the quality assessment process started with the bimodal GMM assumption of the histogram of the frame and a constrained optimization to yield the statistical parameters along with the optimum threshold. Results of the KL divergence minimization to yield an estimate of the bimodal GMM parameters are depicted in FIG. 6. The optimization started with an initial condition of $x_0$=[$\mu_1$, $\sigma_1$, $\mu_2$, $\sigma_2$, $\epsilon T$]=[100, 20, 200, 10, 0.1, 150] and a typical obtained output is [39.56, 33.83, 150.63, 5.30, 0.21, 132]. The last element is the optimum threshold used for ink pixel detection before HPP analysis. Pictorial results of this are shown in FIG. 7.

The 8×4 block based HPP analysis is found to be effective in quantifying the spatial distribution of content and hence the quality of a frame. Two sets of results of this are shown in FIG. 8. Note that a white patch (block) in the frame results in an average HPP value of 1 and a resultant HPP energy of 0. The quality assessment of content frames based on the four component feature model is performed with the following weights: $\alpha_1$=1, $\alpha_2$=50, $\alpha_3$=4, $\alpha_4$=0.4. The results of the quality assessment of handwritten content frames are shown in FIG. 9 and those of slide show content frames are shown in FIG. 10.

The media re-creation to produce a lecture video capsule was performed using FLASH. For this, 250 frames, around the high quality frame instants are selected as highlights. This method performed on a lecture video of 1 hour duration yielded a capsule of about 2 minutes, with suitable proportions of instructional activity highlights.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A system comprising:
    a shot detection and recognition engine configured to:
        receive a video comprising a plurality of frames, and
        classify a frame of the plurality of frames as a non-content frame or a content frame;
    a frame quality assessment engine configured to assess a quality of the frame by:
        dividing a content frame into a plurality of blocks,
        determining a horizontal projection profile (HPP) for a block of the plurality of blocks,
        determining an energy of the HPP for the block,
        summing the energy of the HPP for the block to obtain the energy of the content frame, and
        determining the quality of the content frame based on the HPP and the energy of the content frame;
    a video frame assessment engine configured to select the frame based on the quality of the frame; and
    a video creation engine configured to create a video clip including the selected frame and a portion of the plurality of frames surrounding the selected frame.

2. The system of claim 1, wherein the non-content frame comprises an image.

3. The system of claim 1, wherein the content frame comprises a text image.

4. The system of claim 1, wherein the frame quality assessment engine comprises a non-content frame quality assessment engine configured to assess a quality of the non-content frame.

5. The system of claim 1, wherein the frame quality assessment engine comprises a content frame quality assessment engine configured to assess a quality of the content frame.

6. The system of claim 1, wherein the video frame assessment engine is further configured to:
    select a number of the plurality of non-content frames based on the quality of the non-content frame; and
    select a number of the plurality of content frames based on the quality of the content frame.

7. The system of claim 1, wherein the shot detection and recognition engine is configured to classify the frame of the plurality of frames as the non-content frame or the content frame by detecting a scene change in the video.

8. The system of claim 7, wherein the detecting the scene change in the video comprises:
    computing a histogram of the frame;
    determining whether a difference of a peak of the histogram of the frame and a peak of a histogram of an adjacent frame crosses a predetermined threshold.

9. The system of claim 8, wherein the histogram comprises a distribution of image pixels over intensity values.

10. The system of claim 1, wherein the shot detection and recognition engine is configured to classify the frame of the plurality of frames as the non-content frame or the content frame by categorizing frames using Hidden Markov Models (HMMs).

11. The system of claim 1, wherein the shot detection and recognition engine is configured to classify the frame of the plurality of frames as the non-content frame or the content frame by:
  computing a histogram of the frame, and determining an entropy of the histogram.

12. The system of claim 1, wherein the frame quality assessment engine is configured to assess the quality of the frame by detecting blocking artifacts and blurring artifacts within the frame to identify a reduction in activity.

13. The system of claim 12, wherein the frame quality assessment engine is configured to assess a quality of the frame by further:
  converting the frame to a gray-scale frame;
  computing a histogram of the gray-scale frame;
  assigning a gray scale value for an ink pixel detection threshold; and
  comparing a value of pixels in the gray-scale frame to the ink pixel detection threshold.

14. A system comprising:
  a shot detection and recognition engine configured to:
    receive a video comprising a plurality of frames, and
    classify a frame of the plurality of frames as a non-content frame or a content frame;
  a frame quality assessment engine configured to assess a quality of the frame by:
    constructing a histogram for the frame,
    processing the histogram for the frame to generate a threshold ink detection value and statistical feature,
    detecting ink pixels in the frame using the threshold ink detection value,
    analyzing the detected ink pixels in the frame based on horizontal projection profiles (HPP) and generating a content feature,
    calculating a quality score for the frame based on the statistical feature and the content feature, and
    assessing the quality of the frame based on the quality score;
  a video frame assessment engine configured to select the frame based on the quality of the frame; and
  a video creation engine configured to create a video clip including the selected frame and a portion of the plurality of frames surrounding the selected frame.

15. A method comprising:
  receiving a video comprising a plurality of frames;
  classifying a frame of the plurality of frames as a non-content frame or a content frame;
  assessing a quality of the frame;
  selecting the frame based on the quality of the frame; and
  creating a video clip comprising the selected frame and a portion of the plurality of frames surrounding the selected frame, wherein the creating the video clip comprises:
    synchronizing audio of the selected frame and the portion of the plurality of frames surrounding the selected frame,
    analyzing a corresponding audio frame of the selected frame,
    identifying disturbances in audio of the selected frame, and
    selecting a next frame in the video following the selected frame that has a corresponding audio frame that includes fewer disturbances, wherein the next frame is used to form the video dip.

* * * * *

UNITED STATES PATENT AND TRADEMARK OFFICE
CERTIFICATE OF CORRECTION

PATENT NO.       : 9,202,141 B2
APPLICATION NO.  : 13/692564
DATED            : December 1, 2015
INVENTOR(S)      : Chaudhuri et al.

Page 1 of 1

It is certified that error appears in the above-identified patent and that said Letters Patent is hereby corrected as shown below:

On the title page, item 73, under "Assignee", in Column 1, Lines 1-2, delete "INDIAN INSTITUTE OF TECHNOLOGY BOMBAY (IN)" and insert -- INDIAN INSTITUTE OF TECHNOLOGY BOMBAY, MAHARASHTRA (IN) --, therefor.

In the specification

In Column 1, Lines 8-9, delete "under 35U.S.C. § 120" and insert -- under 35 U.S.C. § 120 --, therefor.

In Column 1, Line 11, delete "under 35 U.S.C. §119" and insert -- under 35 U.S.C. § 119 --, therefor.

In Column 8, Lines 21-22, delete "Kuliback Leibler (KL)" and insert -- Kullback Leibler (KL) --, therefor.

In Column 13, Line 17, delete "an (fly)" and insert -- an (flv) --, therefor.

In Column 17, Line 44, delete "Av B, or C"" and insert -- A, B, or C" --, therefor.

In the claims

In Column 20, Line 35, in Claim 15, delete "video dip." and insert -- video clip. --, therefor.

Signed and Sealed this
Twenty-eighth Day of June, 2016

Michelle K. Lee
*Director of the United States Patent and Trademark Office*